Figure 1:
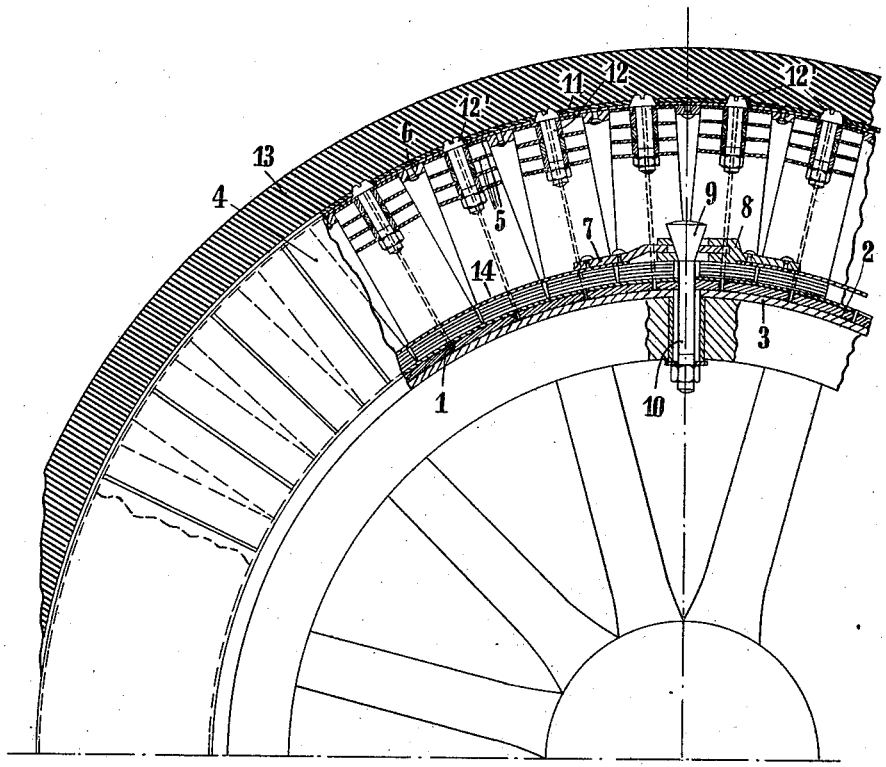

P. RICHTER.
TIRE.
APPLICATION FILED FEB. 8, 1912.

1,083,632.

Patented Jan. 6, 1914.

2 SHEETS—SHEET 1.

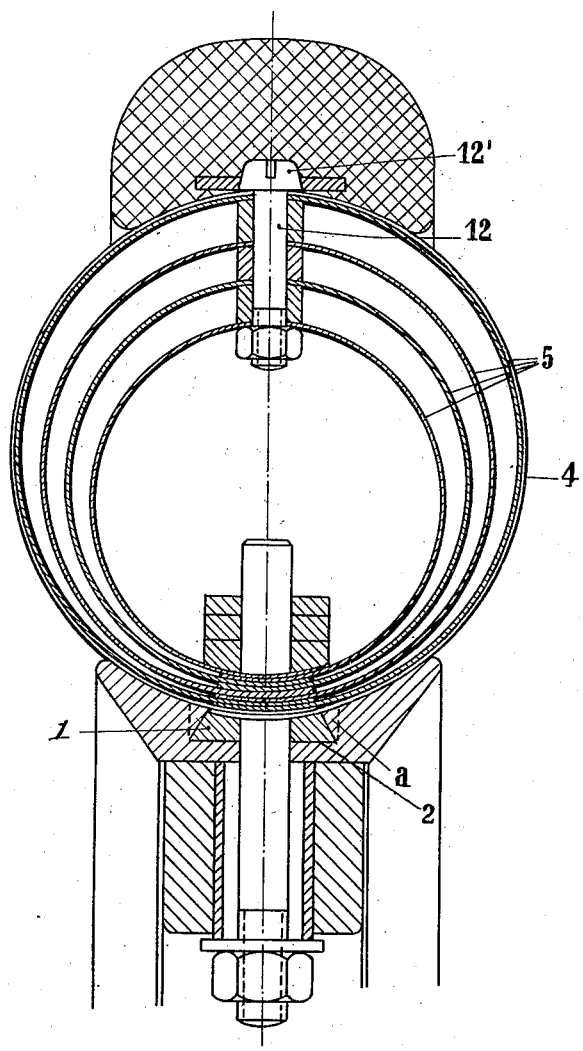

UNITED STATES PATENT OFFICE.

PAUL RICHTER, OF BERLIN, GERMANY.

TIRE.

1,083,632. Specification of Letters Patent. Patented Jan. 6, 1914.

Application filed February 8, 1912. Serial No. 676,334.

*To all whom it may concern:*

Be it known that I, PAUL RICHTER, a subject of the German Emperor, and residing at Berlin, Germany, have invented certain new and useful Improvements in Tires, of which the following is a specification.

My invention relates to that class of elastic tires for wheels, particularly for the wheels of motor-driven vehicles, in which annular segmental springs are employed, and a primary object is to provide an improved tire of this type.

My improved tire comprises not only individual outer annular elastic segments able to be inserted in succession in a suitable groove in the felly of the wheel, but also inner annular elastic segments connected with the outer segments, in combination with a compression band connected to and compressing the outer annular segments. This novel arrangement of outer and inner segmental springs results in an elastic closed hollow metallic tire which is an improvement on well-known constructions comprising individual segmental springs which operate only by themselves.

One illustrative embodiment of my invention is represented by way of example in the accompanying drawings, wherein:—

Figure 1 is a side elevation, partly in section, showing part of a wheel provided with my improved tire, Fig. 2 shows the tire and felly partly in section.

Referring to the drawing, my elastic tire comprises both individual outer segmental springs 4, each provided with a dovetail-shaped lug 1, and several eccentric inner segmental springs 5 connected together in known manner by means of screws 12. The lugs 1 engage in a corresponding dovetail-shaped groove 2 in the felly 3, while the inner springs 5 abut on the one hand against one another at the felly and on the other hand against stops or projections 6 mounted on the outer springs 4.

The tire is assembled by first inserting an outer spring 4 into the groove 2, then inserting a set of inner springs 5 into this outer spring and up to the stop 6; an outer spring 4 is then pushed into the groove 2 up to the former outer spring, whereupon another set of inner springs 5 is inserted in the latter outer spring up to its stop 6. In order to enable the individual springs 4 to be inserted into the groove 2 this groove is cut out rectangularly at one or more places, as shown at *a* in Fig. 2. After the springs have thus been mounted on the felly, however, before the last spring has been introduced as above described, they can be secured by a steel band 14 which surrounds the inner springs 5 at the base thereof and is preferably divided into several parts. The band 14 is tightened by means of the wedge-shaped heads 9 of the screw-bolts 10 which engage in corresponding slots in the members 7, 8 attached to the parts of the steel band.

In order to obtain the preliminary compression of all the inner and outer springs 4 and 5 which is absolutely necessary for uniform elasticity I place about these springs a compression band 11 which has corresponding holes for the passage of the screw heads 12' of the screws 12 and can simultaneously serve as attachment tire for the outer cover 13 proper which can be firmly vulcanized on it.

I claim:—

The combination with a felly having a peripheral groove of dove-tailed cross-section, of a plurality of outer annular springs each having a dove-tailed shaped lug engaging in said groove, a plurality of abutting sets of annular inner springs in said outer springs, an inner stop mounted upon each of said outer springs adapted to be engaged by said inner springs, and a perforated band surrounding and compressing the outer springs, a member carried by each of said sets of inner springs projecting outwardly through the said band, and means comprising a band within said springs for securing the springs to the felly.

In testimony whereof, I affix my signature in the presence of two witnesses.

PAUL RICHTER.

Witnesses:
HENRY HASPER,
WOLDEMAR HAUPT.

---

Copies of this patent may be obtained for five cents each, by addressing the "Commissioner of Patents, Washington, D. C."